Nov. 14, 1950     M. LADGE     2,529,877

BULK DISPENSING CABINET FOR POPCORN AND THE LIKE

Filed May 18, 1946

*INVENTOR.*
MORRIS LADGE
BY
ATTORNEY

Patented Nov. 14, 1950

2,529,877

UNITED STATES PATENT OFFICE 2,529,877

BULK DISPENSING CABINET FOR POPCORN AND THE LIKE

Morris Ladge, Newton, Mass.

Application May 18, 1946, Serial No. 670,817

6 Claims. (Cl. 34—88)

The present invention relates to cabinets for dispensing such things as pop-corn, potato chips, potato sticks, peanuts and other prepared cereal and nut refrshments which may be vended in a warm, hot, or crisp state. For the purposes of brevity, pop-corn will be taken in the rest of the specification as illustrative of the other refreshments.

It is well known that pop-corn is tasty when warm and liberally sprinkled with melted butter and a little salt, and that if vended in this way, the taste appeal is increased. The cabinet of the present invention provides a means of keeping the product at its maximum desirability, warm and at the right amount of moisture or degrees for the air inside is maintained at the desired temperatures by means of recirculating the same air within the cabinet. This tends to keep the popcorn in a constant uniform condition. The air does not escape from the cabinet except at times when the front door is open for dispensing some of the pop-corn, and therefore there is no food odor escaping from the cabinet to any degree. While the cabinet itself may be air-tight otherwise, that is except for the door, this is not strictly essential as very little air will escape. The cabinet is heated with a small heating coil at low cost and without any danger of fire hazard since the heating element is always kept away from the pop-corn in the cabinet. The cabinet requires a minimum of personal attention as the thermostat may be set at the desired temperature and left that way.

An ordinary electric plug with wires is used to provide electrical power for operating the motor and the heating unit from any wall or house socket. The only wire within the cabinet is to the bottom chamber which is sealed off from the rest of the cabinet preferably by metallic wall construction. The parts of the cabinet, if desired, may be made of plastic, but the whole cabinet is preferably made of metal with two conduits at the rear corners which draw the air down from the top of the cabinet for recirculating up through the bottom partition. The cabinet may easily be cleaned by removal of the partition through a large door after which the base of the cabinet is entirely exposed for brushing or cleaning in any way desired. Since the circulating of the air is from the bottom upwards, the tendency is for the bottom section to remain clean at all times.

The invention will be more particularly understood from a consideration of the specification below when taken in connection with the drawings, in which.

Figure 2:
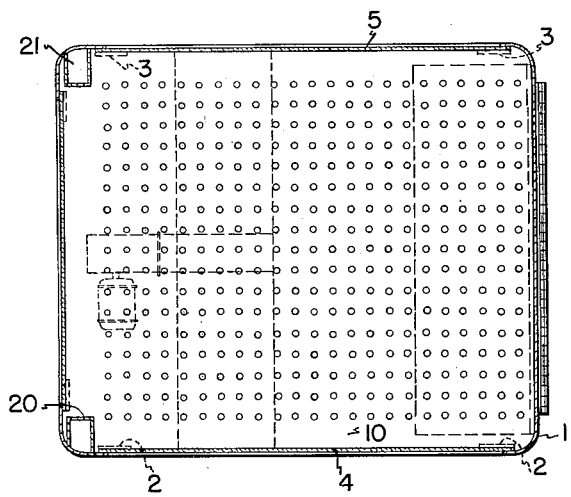
Figure 2 shows a phantom section taken substantially on the line 2—2 of Figure 1.
Figure 3:
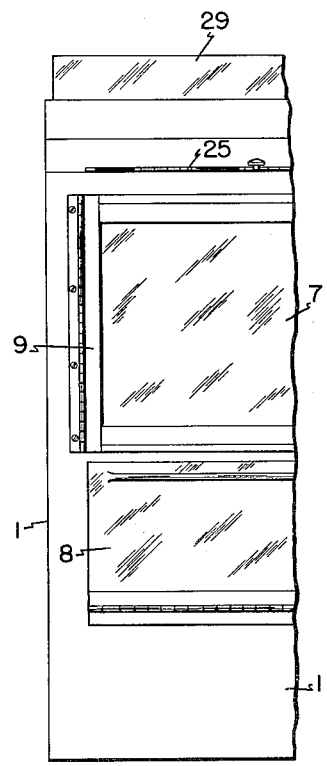
Figure 3 shows a fractional front view of the device as referred to in Figure 1.
Figure 1:
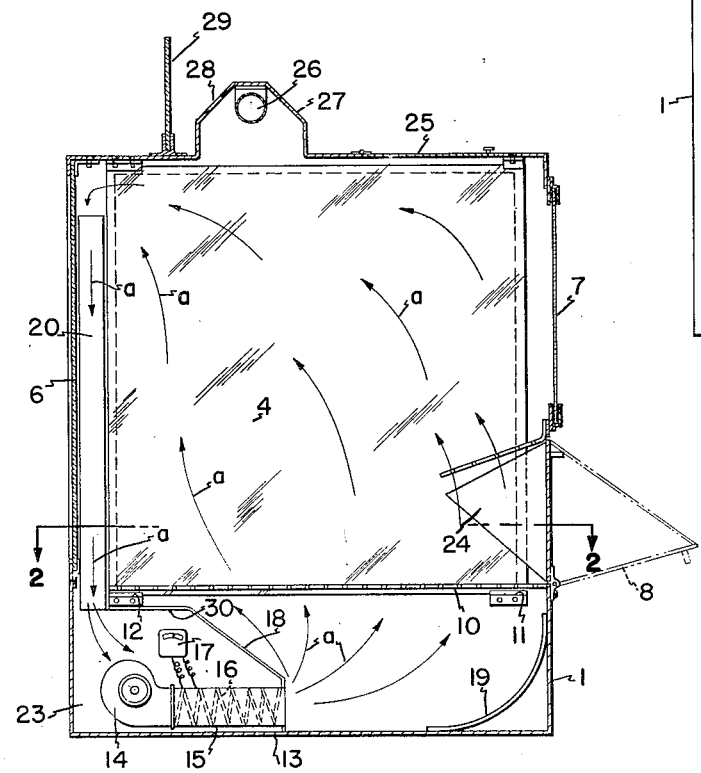
Figure 1 shows a sectional elevation of the device of the present invention.

As indicated in the figures the device comprises an enclosed cabinet 1 which is parallel on the front, back and sides, to receive glass windows through which the merchandize preferably pop-corn and the like may be seen. In this connection inwardly extending angle brackets are attached to walls as indicated at 2, 2 and 3, 3, for the support of the glass plates 4 and 5 respectively. Similarly, or in any usual manner, the glass plates 6 and 7 are supported and retained in the frame of the cabinet or door. The cabinet is therefore completely enclosed and while it is not necessary to effect a hermetical seal, practically no air will escape except through the doors 8, 9 or 25, of which only 8 will be open when the pop-corn or other commodity is being dispensed.

The space within the cabinet is partitioned off with a screen, grid or wire mesh floor at 10, extending over the whole section of the cabinet just below the level of the dispensing door 8. This screen which is perforated with openings not sufficiently large enough to permit the pop-corn to drop through, though the openings should be large enough to permit the free passage of air, is supported by angle brackets 11 and 12 at the corners or near the corners of the cabinet. The screen lays on the angle brackets, but is not attached to them so that the screen may be removed for cleaning, shipping or other purposes as may be desired.

Beneath the screen on the base 13, there is mounted a blower 14, which takes air from within the cabinet and blows the air through a pipe 15 within which is a heating coil 16 controlled through a thermostat 17 for maintaining a constant desired temperature within the cabinet at whatever degree of heat the goods should be vended. At the outlet of the pipe 15 are baffle plates or walls 18 and 19, by means of which the warmed air is directed upwards through the bottom of the screen 10. The warmed air passes up through the goods in the cabinet to the vicinity of the top and is drawn down through two passages, pipes or air conduits 20 and 21 at the rear corners of the cabinet into the lower chamber 23 which is partitioned off from the rest of the bottom section of the cabinet by the wall 30 and the baffle wall 18, except for the outlet at the end of the pipe 15. The air circulating system is shown by the arrows, a, a, etc., which air flows up through the pop-corn or the like downward through the side air conduits or pipes into the chamber 23, from where it is sucked into the fan and sent out through the tube 15.

The goods are dispensed at the door 8 which is provided with V retaining sides 24 and a slanting perforated plate extending from the front wall within the casing over the door so that the goods will not fall out when the door is opened. The large door 9 with the window 7 is provided for the purposes of cleaning the complete cabinet and permits the easy removal of the floor 10 and anything else contained within the cabinet. The door 25 at the top of the cabinet is sufficiently large to permit the cabinet to be filled. This is hinged to be lifted or raised upwards and may be of metal.

The top of the cabinet may also be provided with a light 26 within a suitable reflector 27 mounted to illuminate the goods within the cabinet. The reflector may also have a suitable glass window 28 to permit illumination of the display sign 29 from the same light source.

Having now described my invention, I claim:

1. A device for displaying and dispensing pop-corn and the like comprising a cabinet closed on all sides having erect side walls through which the pop-corn within the casing can be seen, a removable screen partition extending completely across the inside of the cabinet, a dispensing door hinged substantially in the plane of the screen partition having front and side elements and adapted to be swung in a V-angle outwards and downwards, said door having a plate positioned above it attached to the forward side wall of the casing and extending inward over the door in its closed position, conduit means at the corners of the casing extending through said screen to the inside just short of the top of the casing and means positioned below the screen having an inlet communicating with said conduit for drawing air through the conduits and an outlet for sending it up through the screen.

2. A device for displaying and dispensing pop-corn and the like comprising a cabinet closed on all sides having erect side walls through which the pop-corn within the casing can be seen, a removable screen partition extending completely across the inside of the cabinet, a dispensing door hinged substantially in the plane of the screen partition having front and side elements and adapted to be swung in a V-angle outwards and downwards, said door having a plate positioned above it attached to the forward side wall of the casing and extending inward over the door in its closed position, a second door attached to the forward side wall above the first mentioned door and adapted to be swung open outwards and to the side, conduit means at the corners of the casing extending through said screen to the inside just short of the top of the casing, and means positioned below the screen having an inlet communicating with said conduit for drawing air through the conduits and an outlet for sending it up through the screen.

3. A device for displaying and dispensing pop-corn and the like, comprising a cabinet closed on all sides having erect side walls through which the pop-corn within the casing can be seen, a removable screen partition extending completely across the inside of the cabinet, a dispensing door hinged substantially in the plane of the screen partition having front and side elements and adapted to be swung in a V-angle outwards and downwards, said door having a plate positioned above it attached to the forward side wall of the casing and extending inward over the door in its closed position, conduit means at the corners of the casing extending through said screen to the inside just short of the top of the casing, means forming a chamber in the section of the casing below the screen directly connected to the lower end of said conduits, a blower positioned in said chamber having an outlet coinciding with an outlet of said chamber, a heating coil in the outlet of the blower and a baffle below the screen to direct the flow of air upwards through said screen.

4. A device for displaying and dispensing pop-corn and the like comprising a cabinet closed on all sides having erect walls forming front, sides and back of the cabinet through which the pop-corn within the casing can be seen, a removable screen partition extending completely across the inside of the cabinet, a dispensing door hinged to the front wall not substantially above the plane of the screen partition, said door having front and side elements and adapted to be swung in a V-angle outwards and downwards, said door having a plate positioned above it attached to the forward side wall of the casing and extending upward over the door in its closed position, conduit means at the corners of the casing adjacent the rear wall and extending in an up and down direction through said screen to the inside just short of the top of the casing, means forming a chamber below the screen in the casing in which said conduits extend, a blower contained in said chamber, said chamber having an outlet through which the blower forces air, means in said casing below the screen for directing the air upwards whereby in combination with the inlet to said conduits at the top of said casing said pop-corn is kept away from the dispensing door.

5. A device for displaying and dispensing pop-corn and the like comprising a cabinet closed on all sides having erect walls forming front, sides and back of the cabinet through which the pop-corn within the casing can be seen, a removable screen partition extending completely across the inside of the cabinet, a dispensing door hinged to the front wall not substantially above the plane of the screen partition, said door having front and side elements and adapted to be swung in a V-angle outwards and downwards, said door having a plate positioned above it attached to the forward side wall of the casing and extending upward over the door in its closed position, conduit means at the corners of the casing adjacent the rear wall and extending in an up and down direction through said screen to the inside just short of the top of the casing, means forming a chamber below the screen in the casing in which said conduits extend, a blower contained in said chamber, said chamber having an outlet through which the blower forces air, said outlet being directed towards the front wall of said casing, a curved deflecting plate positioned in front of said front wall at its lower end directing the air blown against it upwards and rearwards away from the front dispensing door.

6. A device for displaying and dispensing pop-corn and the like comprising a cabinet closed on all sides having erect walls forming front, sides and back of the cabinet through which the pop-corn within the casing can be seen, a removable screen partition extending completely across the inside of the cabinet, a dispensing door hinged to the front wall not substantially above the plane of the screen partition, said door having front and side elements and adapted to be swung in a V-angle outwards and downwards, said door having a plate positioned above it attached to the forward side wall of the casing and extending upward over the door in its closed position, conduit means at the corners of the casing adjacent the rear wall and extending in an up and down direction through said screen to the inside just short of the top of the casing, means forming a chamber below the screen in the casing in which said conduits extend, a blower contained in said chamber, said chamber having an outlet through which the blower forces air, said outlet being directed towards the front wall of said casing, a curved deflecting plate positioned in front of said front wall at its lower end directing the air blown against it upwards and rearwards away from the front dispensing door the plate above the dispensing door being provided with perforations through which some of the upwards and backwardly blown air passes.

MORRIS LADGE.

REFERENCES CITED

The following references are of record in the file of this patent:

UNITED STATES PATENTS

| Number | Name | Date |
|---|---|---|
| 1,463,179 | Stephens | July 31, 1923 |
| 1,973,347 | Kelly | Sept. 11, 1934 |
| 1,979,515 | Wilson | Nov. 6, 1934 |
| 1,989,530 | Shodron | Jan. 29, 1935 |
| 2,188,708 | Davis | Jan. 30, 1940 |
| 2,248,633 | Lee | July 8, 1941 |
| 2,396,455 | Booth | Mar. 12, 1946 |
| 2,414,642 | Gary | Jan. 21, 1947 |
| 2,423,342 | Pinanski | July 1, 1947 |

FOREIGN PATENTS

| Number | Country | Date |
|---|---|---|
| 336,679 | Great Britain | Oct. 20, 1930 |